(12) United States Patent
Nosker et al.

(10) Patent No.: US 10,253,154 B2
(45) Date of Patent: *Apr. 9, 2019

(54) IN SITU EXFOLIATION METHOD TO FABRICATE A GRAPHENE-REINFORCED POLYMER MATRIX COMPOSITE

(71) Applicant: Rutgers, The State University of New Jersey, New Brunswick, NJ (US)

(72) Inventors: Thomas Nosker, Stockton, NJ (US); Jennifer Lynch, Franklin Park, NJ (US); Bernard Kear, Whitehouse Station, NJ (US); Justin Hendrix, Washington, DC (US); Gordon Chiu, Summit, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/784,974

(22) PCT Filed: Apr. 18, 2014

(86) PCT No.: PCT/US2014/034624
§ 371 (c)(1),
(2) Date: Oct. 16, 2015

(87) PCT Pub. No.: WO2014/172619
PCT Pub. Date: Oct. 23, 2014

(65) Prior Publication Data
US 2016/0083552 A1    Mar. 24, 2016

Related U.S. Application Data

(60) Provisional application No. 61/813,621, filed on Apr. 18, 2013.

(51) Int. Cl.
| | | |
|---|---|---|
| C08K 3/04 | (2006.01) |
| C08J 3/20 | (2006.01) |
| B32B 9/00 | (2006.01) |
| C08G 8/28 | (2006.01) |
| C08L 23/06 | (2006.01) |
| C08L 23/12 | (2006.01) |
| C08L 25/06 | (2006.01) |
| C08L 27/06 | (2006.01) |
| C08L 27/16 | (2006.01) |
| C08L 27/18 | (2006.01) |
| C08L 33/12 | (2006.01) |
| C08L 33/20 | (2006.01) |
| C08L 55/02 | (2006.01) |
| C08L 61/16 | (2006.01) |
| C08L 67/00 | (2006.01) |
| C08L 69/00 | (2006.01) |
| C08L 71/00 | (2006.01) |
| C08L 77/00 | (2006.01) |
| C08L 79/08 | (2006.01) |

(Continued)

(52) U.S. Cl.
CPC .................. *C08K 3/04* (2013.01); *B32B 9/00* (2013.01); *C08G 8/28* (2013.01); *C08J 3/20* (2013.01); *C08K 3/042* (2017.05); *C08L 23/06* (2013.01); *C08L 23/12* (2013.01); *C08L 25/06* (2013.01); *C08L 27/06* (2013.01); *C08L 27/16* (2013.01); *C08L 27/18* (2013.01); *C08L 33/12* (2013.01); *C08L 33/20* (2013.01); *C08L 55/02* (2013.01); *C08L 61/16* (2013.01); *C08L 67/00* (2013.01); *C08L 69/00* (2013.01); *C08L 71/00* (2013.01); *C08L 77/00* (2013.01); *C08L 79/08* (2013.01); *C08L 81/04* (2013.01); *B82Y 30/00* (2013.01)

(58) Field of Classification Search
CPC ................ C08K 3/04; C08J 3/20; C08J 3/201
See application file for complete search history.

(56) References Cited

U.S. PATENT DOCUMENTS 6,042,765 A * 3/2000 Sugahara .............. B29C 70/506
264/257
6,962,431 B1   11/2005 Luker
(Continued)

FOREIGN PATENT DOCUMENTS

CN    101817516 A    9/2010
EP    2287244 A1     2/2011
(Continued)

OTHER PUBLICATIONS

Choudhary, et al: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.
(Continued)

*Primary Examiner* — Vickey Nerangis
(74) *Attorney, Agent, or Firm* — Fox Rothschild LLP

(57) ABSTRACT

A method for forming a graphene-reinforced-polymer matrix composite by distributing graphite microparticles into a molten thermoplastic polymer phase comprising one or more molten thermoplastic polymers; and applying a succession of shear strain events to the molten polymer phase so that the molten polymer phase exfoliates the graphene successively with each event, until tearing of exfoliated multilayer graphene sheets occurs arid produces reactive edges on the multilayer sheets that react with and cross-link the one or more thermoplastic polymers; where the one or more thermoplastic polymers are selected from thermoplastic polymers subject to UV degradation.

11 Claims, 6 Drawing Sheets

(51) Int. Cl.
*C08L 81/04* (2006.01)
*B82Y 30/00* (2011.01)

(56) References Cited

U.S. PATENT DOCUMENTS

| | | | |
|---|---|---|---|
| 8,167,190 B1 * | 5/2012 | Bullock | B23K 1/0008 |
| | | | 228/119 |
| 8,734,696 B1 | 5/2014 | Torkelson et al. | |
| 9,896,565 B2 * | 2/2018 | Nosker | C08K 3/04 |
| 2010/0147188 A1 | 6/2010 | Mamak et al. | |
| 2010/0317790 A1 | 12/2010 | Jang et al. | |
| 2011/0017955 A1 | 1/2011 | Zhamu et al. | |
| 2011/0114189 A1 | 5/2011 | Crain et al. | |
| 2011/0133134 A1 | 6/2011 | Varma et al. | |
| 2011/0186789 A1 | 8/2011 | Samulski et al. | |
| 2012/0065299 A1 | 3/2012 | Lukehart et al. | |
| 2012/0068124 A1 | 3/2012 | Dickinson et al. | |
| 2012/0264836 A1 * | 10/2012 | Felisari | C08J 9/0066 |
| | | | 521/79 |
| 2013/0018204 A1 | 1/2013 | Jeon et al. | |
| 2013/0072613 A1 | 3/2013 | Miltner et al. | |
| 2014/0141257 A1 | 5/2014 | Ranade et al. | |
| 2015/0267030 A1 | 9/2015 | Nosker et al. | |
| 2016/0009561 A1 | 1/2016 | Coleman et al. | |

FOREIGN PATENT DOCUMENTS

| | | |
|---|---|---|
| JP | H08-053571 A | 2/1996 |
| JP | 2003-138145 A | 5/2003 |
| JP | 2003-531802 A | 10/2003 |
| JP | 2008-266577 A | 11/2008 |
| JP | 2009-542839 A | 12/2009 |
| JP | 2012500179 A | 1/2012 |
| JP | 2013018825 A | 1/2013 |
| JP | 2013-233790 A | 11/2013 |
| JP | 2015537075 A | 12/2015 |
| WO | 2009018204 A1 | 2/2009 |
| WO | 2009/029984 A1 | 3/2009 |
| WO | 2010107763 A1 | 9/2010 |
| WO | 2010115173 A1 | 10/2010 |
| WO | 2011042800 A1 | 4/2011 |
| WO | 2012013303 A1 | 2/2012 |
| WO | 2012020099 A1 | 2/2012 |
| WO | 2012049121 A1 | 4/2012 |
| WO | 2014062226 A1 | 4/2014 |
| WO | 20140172619 A1 | 10/2014 |
| WO | 2015044478 | 4/2015 |
| WO | 2016018995 A1 | 2/2016 |

OTHER PUBLICATIONS

Lu, Ya-yun, et al., "Preparation of Polyethylene/Expanded Graphite Intercalated Composites by In-situ Expanding Method," China Plastics (Jul. 2009), vol. 23, No. 7, pp. 49-54 (with English abstract).

Novoselov et al., "Electric Field Effect in Atomically Thin Carbon Films," Science (2004); 306:666-669.

Eda, et al: Chemically Derived Graphene Oxide: Towards Large-Area Thin-Film Electronics and Optoelectronics; Advanced Materials, 2010, vol. 22, pp. 2392-2415.

Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.

Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.

Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.

NPL_ThomasSwan; "Elicarb Graphene Epoxy Dispersion", Advanced Materials, Publication [unknown].

NPL_Xie, et al "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].

NPL_Jonathan N. Coleman: "Liquid Exfoliation of Defect-Free Graphene", Accounts of Chemical Research, 2013, vol. 6, No. 1, pp. 14-22

* cited by examiner

IN SITU EXFOLIATION METHOD TO FABRICATE A GRAPHENE-REINFORCED POLYMER MATRIX COMPOSITE

CROSS REFERENCE TO RELATED APPLICATIONS

The present application is a U.S. National Phase of International Application No. PCT/US2014/034624, filed Apr. 18, 2014, which claims the benefit of priority under 35 U.S.C. § 119(e) of U.S. Provisional Application No. 61/813,621, filed on Apr. 18, 2013, the entire disclosures of which are incorporated herein by reference.

TECHNICAL FIELD

The present invention relates to high efficiency mixing methods to transform a polymer composite containing well-crystallized graphite particles into nano-dispersed single or multi-layer graphene particles having various commercial applications. The present invention also relates to methods to activate graphite and graphene using in situ mechanical exfoliation.

BACKGROUND OF THE INVENTION

Polymer compositions are being increasingly used in a wide range of areas that have traditionally employed the use of other materials, such as metals. Polymers possess a number of desirable physical properties, are light weight, and inexpensive. In addition, many polymer materials may be formed into a number of various shapes and forms and exhibit significant flexibility in the forms that they assume, and may be used as coatings, dispersions, extrusion and molding resins, pastes, powders, and the like.

There are various applications for which it would be desirable to use polymer compositions, which require materials with electrical conductivity. However, a significant number of polymeric materials fail to be intrinsically electrically or thermally conductive enough for many of these applications.

Graphene is a substance composed of pure carbon in which atoms are positioned in a hexagonal pattern in a densely packed one-atom thick sheet. This structure is the basis for understanding the properties of many carbon-based materials, including graphite, large fullerenes, nano-tubes, and the like (e.g., carbon nano-tubes are generally thought of as graphene sheets rolled up into nanometer-sized cylinders). Graphene is a single planar sheet of $sp^2$ bonded carbon atoms. Graphene is not an allotrope of carbon because the sheet is of finite size and other elements can be attached at the edge in non-vanishing stoichiometric ratios.

When used to reinforce polymers, graphene in any form increases polymer toughness by inhibiting crack propagation. Graphene can also be added to polymers and other compositions to provide electrical and thermal conductivity. The thermal conductivity of graphene makes it an ideal additive for thermal management (e.g., planar heat dissipation) for electronic devices and lasers. Some commercial applications of carbon fiber-reinforced polymer matrix composites (CF-PMCs) include aircraft and aerospace systems, automotive systems and vehicles, electronics, government defense/security, pressure vessels, and reactor chambers, among others.

Progress in the development of low cost methods to effectively produce graphene-reinforced polymer matrix composites (G-PMCs) remains very slow. Currently, some of the challenges that exist affecting the development of G-PMCs viable for use in real world applications include the expense of the materials and the impracticality of the presently used chemical and/or mechanical manipulations for large-scale commercial production. It would thus be desirable for a low cost method to produce a G-PMC suitable for large-scale commercial production that offers many property advantages, including increased specific stiffness and strength, enhanced electrical/thermal conductivity, and retention of optical transparency.

SUMMARY OF THE INVENTION

The present disclosure provides polymer processing methods to fabricate a graphene-reinforced polymer matrix composite (G-PMC) by elongational flow and folding of well-crystallized graphite particles dispersed in a molten polymer matrix.

In one aspect, there is provided herein a method for forming a graphene-reinforced polymer matrix composite, including: distributing graphite microparticles into a molten thermoplastic polymer phase; and applying a succession of shear strain events to the molten polymer phase so that the molten polymer phase exfoliates the graphite successively with each event until at least 50% of the graphite is exfoliated to form a distribution in the molten polymer phase of single- and multi-layer graphene nano-particles less than 50 nanometers thick along a c-axis direction.

In certain embodiments, the graphite particles may be prepared by crushing and grinding a graphite-containing mineral to millimeter-sized dimensions.

In certain embodiments, the millimeter-sized particles may be reduced to micron-sized dimensions using any known method, such as ball milling or attritor milling.

In certain embodiments, the graphite particles are extracted from the micron-sized particle mixture, preferably by a flotation method.

In certain embodiments, the extracted graphite particles may be incorporated in a polymer matrix using a single screw extruder with axial fluted extensional mixing elements or spiral fluted extensional mixing elements.

In certain embodiments, the graphite-containing polymer matrix is subjected to repeated extrusion to induce exfoliation of the graphitic material, thus forming a uniform dispersion of graphene nanoparticles in the polymer matrix.

In certain embodiments, the thermoplastic polymer is an aromatic polymer. The aromatic polymer preferably comprises phenyl groups, optionally substituted, either as part of the backbone or as substituents on the backbone. In certain embodiments the optionally substituted phenyl groups are contained within the polymer backbone as optionally substituted phenylene groups. In certain other embodiments the optionally substituted phenyl groups are substituents on the polymer. In specific embodiments, the thermoplastic polymer is selected from polyetheretherketones, polyether-ketones, polyphenylene sulfides, polyethylene sulfides, polyetherimides, polyvinylidene fluorides, polysulfones, polycarbonates, polyphenylene ethers or oxides, polyamides such as nylons, aromatic thermoplastic polyesters, aromatic polysulfones, thermoplastic polyimides, liquid crystal polymers, thermoplastic elastomers, polyethylenes, polypropylenes, polystyrene, acrylics, such as polymethylmethacrylate, polyacrylonitrile, acrylonitrile butadiene styrene, and the like, ultra-high-molecular-weight polyethylene, polytetrafluoroethylene, polyoxymethylene plastic, polyaryletherketones, polyvinylchloride, and mixtures thereof.

In certain embodiments, in combination with other embodiments, the succession of shear strain events may be applied until at least 50% of the graphite is exfoliated to form a distribution in the molten polymer phase of single- and multi-layer graphene nanoparticles less than 25 nanometers thick along the c-axis direction.

In certain embodiments, in combination with other embodiments, the succession of shear strain events may be applied until at least 50% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 90% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 80% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 75% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 70% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 60% of the graphite is exfoliated to form a distribution in the molten polymer phase of single- and multi-layer graphene nanoparticles less than 10 nanometers thick along the c-axis direction.

In certain embodiments, in combination with other embodiments, the graphite may be doped with other elements to modify the surface chemistry of the exfoliated graphene nanoparticles.

In certain embodiments, in combination with other embodiments, the graphite is expanded graphite.

In certain embodiments, in combination with other embodiments, the surface chemistry or nanostructure of the dispersed graphite may be modified to enhance bond strength with the polymer matrix to increase strength and stiffness of the graphene composite.

In certain embodiments, in combination with other embodiments, directional alignment of the graphene nanoparticles is used to obtain one-, two- or three-dimensional reinforcement of the polymer matrix phase.

In another aspect of the disclosed invention, there is provided herein a method for forming a cross-linked G-PMC, including: distributing graphite microparticles into a molten thermoplastic polymer phase comprising one or more molten thermoplastic polymers; and applying a succession of shear events to said molten polymer phase, so that said molten polymer phase exfoliates the grapheme with each event, until tearing of exfoliated multilayer graphene sheets occurs and produces reactive edges on said multilayer sheets that react with and cross-link said thermoplastic polymer.

In another aspect of the disclosed invention, there is provided herein a method for forming a high strength cross-linked G-PMC, including: distributing graphite microparticles into a molten thermoplastic polymer phase comprising one or more molten thermoplastic polymers; applying a succession of shear strain events to the molten polymer phase so that said molten polymer phase exfoliates the graphene successively with each event, until tearing of exfoliated multilayer graphene sheets occurs and produces reactive edges on said multilayer sheets that react with and cross-link said thermoplastic polymer, to form a graphene-reinforced polymer matrix composite; and further grinding and distributing the graphene-reinforced polymer matrix composite with another non-cross-linked thermoplastic polymer.

In certain embodiments, the graphite particles may be prepared by crushing and grinding a graphite-containing mineral to millimeter-sized dimensions, followed by reduction to micron-sized particles by milling.

In certain embodiments, the graphite particles are extracted from the micron-sized particle mixture, preferably by a flotation method, to obtain Separated Mineral Graphite ("SMG").

In certain embodiments, the molten thermoplastic polymer phase comprises two molten thermoplastic polymers.

In certain embodiments, the thermoplastic polymers are selected from polyether-etherketone (PEEK), polyetherketone (PEK), polyphenylene sulfide (PPS), polyethylene sulfide (PES), polyetherimide (PEI), polyvinylidene fluoride (PVDF), polycarbonate (PC), poly-phenylene ether, aromatic thermoplastic polyesters, thermoplastic polyimides, liquid crystal polymers, thermoplastic elastomers, polyethylene, polypropylene, polystyrene (PS), acrylics, such as polymethylmethacrylate (PMMA), polyacrylonitrile (PAN), acrylonitrile butadiene styrene (ABS), and the like, ultra-high-molecular-weight polyethylene (UHMWPE), poly-tetra-fluoroethylene (PTFE/Teflon®), polyamides (PA) such as nylons, polyphenylene oxide (PPO), polyoxymethylene plastic (POM/Acetal), polyaryletherketones, polyvinylchloride (PVC), and mixtures thereof.

BRIEF DESCRIPTION OF THE DRAWINGS

FIGS. 1A, 1B, 1C, 1D, 1E, 1F, 1G, 1H, 1J and 1I illustrate the morphology analysis of 2% graphite exfoliated in polysulfone at mixing times of 3 minutes, 30 minutes, and 90 minutes according to an in situ exfoliation method of the present disclosure.

DETAILED DESCRIPTION OF THE INVENTION

Figures 1A, 1B, 1C, 1D, 1E, 1F, 1G, 1H, 1I:
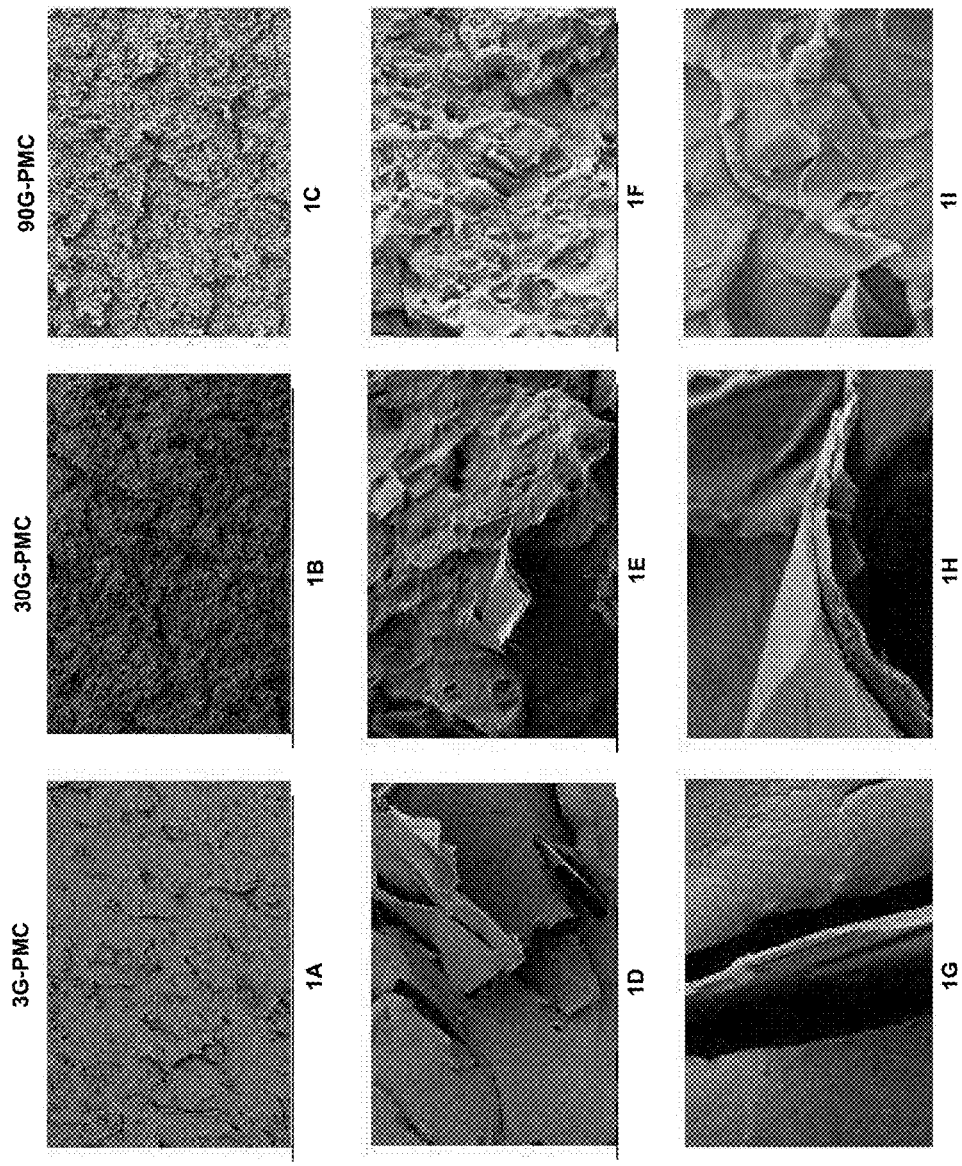

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

The following term(s) shall have, for purposes of this application, the respective meanings set forth below:

The term "graphene" refers to the name given to a single layer of carbon atoms densely packed into a fused benzene-ring structure. Graphene, when used alone, may refer to multi-layer graphene, graphene flakes, graphene platelets, and few-layer graphene or single-layer graphene in a pure and uncontaminated form.

The present invention provides a high efficiency mixing method to transform a polymer composite that contains well-crystallized graphite particles into nano-dispersed single- or multi-layer graphene particles. The method involves in situ exfoliation of the graphite layers by compounding in a batch mixer or extruder that imparts repetitive, high shear strain rates. In both processes, longer mixing times provide enhanced exfoliation of the graphite into graphene nanoparticles within the polymer matrix composite (PMC). In addition, additives may be used to promote sufficient graphene/polymer bonding, thereby yielding a low density graphene-reinforced polymer matrix composite (G-PMC). The method is low cost to produce a G-PMC that offers numerous property advantages, including increased specific stiffness and strength, enhanced electrical/thermal conductivity, and retention of optical transparency. Furthermore, these properties are tunable by modification of the process, vide infra.

Repeated compounding during a batch mixing process or single screw extrusion is used to progressively transform the initial graphite-particle dispersion into a uniform nano-dispersion of discrete graphene nanoparticles. In some cases, an inert gas or vacuum may be used during processing. The method is described herein as "mechanical" exfoliation to distinguish it from "chemical" exfoliation, which is the primary thrust of much of the current research. An advantage of the mechanical method is that contamination-free graphene-polymer interfaces are formed during high-shear mixing, thus ensuring good interface adhesion or bonding. Other advantages of in situ exfoliation are that it avoids making and handling graphene flakes, as well as avoiding the need to disperse them uniformly in the polymer matrix phase. Superior mixing produces finer composite structures and very good particle distribution.

Depending on the number of in situ shear strain events, the method provides multi-layer graphene, graphene flakes, graphene platelets, few-layer graphene or single-layer graphene in a pure and uncontaminated form. Platelets have diamond-like stiffness and are used for polymer reinforcement. Graphene in any form increases polymer toughness by inhibiting crack propagation as a reinforcement for polymers. Graphene may be used as an additive to polymers and other compositions to provide electrical and thermal conductivity. The thermal conductivity of graphene makes it a desirable additive for thermal management for electronic devices and lasers.

Graphite, the starting material from which graphene is formed, is composed of a layered planar structure in which the carbon atoms in each layer are arranged in a hexagonal lattice. The planar layers are defined as having an "a" and a "b" axis, with a "c" axis normal to the plane de-fined by the "a" and "b" axes. The graphene particles produced by the inventive method have an aspect ratio defined by the "a" or "b" axis distance divided by the "c" axis distance. Aspect ratio values for the inventive nanoparticles exceed 25:1 and typically range between 50:1 and 1000:1.

It should be understood that essentially any polymer inert to graphite and capable of imparting sufficient shear strain to exfoliate graphene from the graphite may be used in the method of the present invention. Examples of such polymers include, but are not limited to, poly-etheretherketones (PEEK), polyetherketones (PEK), polyphenylene sulfides (PPS), polyethylene sulfide (PES), polyetherimides (PEI), polyvinylidene fluoride (PVDF), polysulfones (PSU), polycarbonates (PC), polyphenylene ethers, aromatic thermoplastic polyesters, aromatic polysulfones, thermoplastic polyimides, liquid crystal polymers, thermoplastic elastomers, polyethylene, poly-propylene, polystyrene (PS), acrylics, such as polymethylmethacrylate (PMMA), polyacrylonitrile (PAN), acrylonitrile butadiene styrene (ABS), and the like, ultra-high-molecular-weight polyethylene (UHMWPE), polytetrafluoroethylene (PTFE/Teflon®), polyamides (PA) such as nylons, polyphenylene oxide (PPO), polyoxymethylene plastic (POM/Acetal), polyarylether-ketones, polyvinylchloride (PVC), mixtures thereof, and the like. Polymers capable of wetting the graphite surface may be used as well as high melting point, amorphous polymers in accordance with the method of the present invention. In certain embodiments, the thermoplastic polymer of the graphene-reinforced polymer matrix is an aromatic polymer, as defined herein.

The graphene may be produced as a graphene-polymer mixture suitable for use as-is as a G-PMC that can be pelletized by conventional means for subsequent fabrication processing. Alternatively, higher concentrations of graphite may be used at the outset to provide a graphene-polymer masterbatch in concentrated form that can also be pelletized and then used to add graphene to polymer compositions as a reinforcing agent. As a further alternative, the graphene may be separated from the polymer, for example, by combustion or selective dissolution, to provide essentially pure particles of graphene.

Graphene-reinforced polymers according to the present invention typically contain between about 0.1 and about 30 wt % graphene. More typically, the polymers contain between about 1.0 and about 10 wt % graphene. Polymer masterbatches typically contain between about 5 and about 50 wt % graphene, and more typically between about 10 and about 30 wt % graphene.

The availability of graphite-rich mineral deposits, containing relatively high concentrations (e.g., about 20%) of well-crystallized graphite, makes for a low cost and virtually inexhaustible source of raw material. As discussed below, the extraction of graphite particles from mined material can be accomplished in a cost-effective manner. Synthetic graphite of high purity and exceptional crystallinity (e.g., pyrolytic graphite) may also be used for the same purpose. However, in this case, the batch mixing or extrusion compounding-induced exfoliation process creates a laminated composite, in which the graphene nanoparticles are oriented over a relatively large area. Such laminated composites may be preferred for specific applications.

Mechanical exfoliation of graphite within a polymer matrix may be accomplished by a polymer processing technique that imparts repetitive high shear strain events to mechanically exfoliate graphite microparticles into multi- or single-layer graphene nanoparticles within the polymer matrix.

For purposes of the present invention, graphite microparticles are defined as graphite in which at least 50% of the graphite consists of multilayer graphite crystals ranging between 1.0 and 1000 microns thick along the c-axis of the lattice structure. Typically 75% of the graphite consists of crystals ranging between 100 and 750 microns thick. Expanded graphite may also be used. Expanded graphite is made by forcing the crystal lattice planes apart in natural flake graphite, thus expanding the graphite, for example, by immersing flake graphite in an acid bath of chromic acid, then concentrated sulfuric acid. Expanded graphite suitable for use in the present invention include expanded graphite with opened edges at the bilayer level, such as MESOGRAF.

A succession of shear strain events is defined as subjecting the molten polymer to an alternating series of higher and lower shear strain rates over essentially the same time intervals so that a pulsating series of higher and lower shear forces associated with the shear strain rate are applied to the graphite particles in the molten polymer. Higher and lower shear strain rates are defined as a first higher, shear strain rate that is at least twice the magnitude of a second lower shear strain rate. The first shear strain rate will range between 100 and 10,000 $\sec^{-1}$. At least 1,000 to over 10,000,000 alternating pulses of higher and lower shear strain pulses are applied to the molten polymer to form the exfoliated graphene nanoparticles. The number of alternating pulses required to exfoliate graphite particles into graphene particles may be dependent on the original graphite particle dimensions at the beginning of this process, i.e., smaller original graphite particles may need a lower number of alternating pulses to achieve graphene than larger original graphite particles. This can be readily determined by one of ordinary skill in the art guided by the present specification without undue experimentation.

After high-shear mixing, the graphene flakes are uniformly dispersed in the molten polymer, are randomly oriented, and have high aspect ratio. Orientation of the graphene may be achieved by many different methods. Conventional drawing, rolling, and extrusion methods may be used to directionally align the graphene within the PMC fiber, filament, ribbon, sheet, or any other long-aspect shape. The method to fabricate and characterize a G-PMC is comprised of four main steps comprising:

1. Extraction of crystalline graphite particles from a mineral source;
2. Incorporation of the extracted graphite particles into a polymer matrix phase and conversion of the graphite-containing polymer into a graphene-reinforced polymer matrix composite (G-PMC) by a high efficiency mixing/exfoliation process;
3. Morphology analysis to determine the extent of mechanical exfoliation and distribution of multi-layer graphene and graphene nanoparticles; and
4. X-ray diffraction analysis to determine multi-layer graphene or graphene crystal size as a function of mechanical exfoliation.

Highly crystalline graphite may be extracted from graphite ore by a multi-step process, as described below.

1. Crushing: A drilled rod of graphite ore from the mine may be placed in a vice and crushed.
2. Grinding: The crushed graphite ore may be then ground by mortar and pestle.
3. Size Reduction: The ground graphite ore may be placed in a sieve with a 1-mm mesh size and size reduced. Larger pieces that do not pass through the screen may be ground by mortar and pestle and then size reduced through the 1-mm mesh size again. Eventually, all of the material passed through the 1-mm mesh size to obtain graphite ore powder.
4. Density Separation by Water: The 1-mm sized powder may be placed in a column filled with water and agitated until a clear separation formed between the more dense portions of the solids and the less dense portions. Graphite is near the density of water (1 $g/cm^3$), while silicon is much more dense (2.33 $g/cm^3$). The uppermost materials are siphoned off with the water and then dried. The dried powder graphite is referred to as Separated Mineral Graphite (SMG).

In commercial practice, very large crushing and grinding machines are available to produce tonnage quantities of mixed powders, from which the graphite component can be separated by standard floatation methods.

One embodiment is directed to an in situ exfoliation method of fabricating a G-PMC. In this method, a polymer that is uniformly blended with micron-sized crystalline graphite particles is subjected to repeated compounding-element processing during batch mixing or extrusion at a temperature where the polymer adheres to the graphite particles. Typical polymers have a heat viscosity (without graphite) greater than 100 cps at the compounding temperature. The compounding temperature will vary with the polymer and can range between room temperature (for polymers that are molten at room temperature) and 600° C. Typical compounding temperatures will range between 180° C. and 400° C.

In one embodiment, the extrusion compounding elements are as described in U.S. Pat. No. 6,962,431, the disclosure of which is incorporated herein by reference, with compounding sections, known as axial fluted extensional mixing elements or spiral fluted extensional mixing elements. The compounding sections act to elongate the flow of the polymer and graphite, followed by repeated folding and stretching of the material. This results in superior distributive mixing, which in turn, causes progressive exfoliation of the graphite particles into discrete graphene nanoparticles. Batch mixers may also be equipped with equivalent mixing elements. In another embodiment, a standard-type injection molding machine is modified to replace the standard screw with a compounding screw for the purpose of compounding materials as the composition is injection molded. Such a device is disclosed in US 2013/0072627, the entire disclosure of which is incorporated herein by reference.

Thus, the effect of each compounding pass is to shear-off graphene layers one after the other, such that the original graphite particles are gradually transformed into a very large number of graphene nanoparticles. After an appropriate number of such passes, the final result is a uniform dispersion of discrete graphene nanoparticles in the polymer matrix phase. Longer mixing times or a higher number of passes through the compounding elements provides smaller graphite crystal size and enhanced exfoliation of graphite into graphene nanoparticles within the polymer matrix; however, the shear events should not be of a duration that would degrade the polymer.

As the content of graphene nanoparticles increases during multi-pass extrusion, the viscosity of the polymer matrix increases due to the influence of the growing number of polymer/graphene interfaces. To ensure continued refinement of the composite structure, the extrusion parameters are adjusted to compensate for the higher viscosity of the composite.

Automated extrusion systems are available to subject the composite material to as many passes as desired, with mixing elements as described in U.S. Pat. No. 6,962,431, and equipped with a re-circulating stream to direct the flow back to the extruder input. Since processing of the graphene-reinforced PMC is direct and involves no handling of graphene particles, fabrication costs are low.

In order to mechanically exfoliate graphite into multi-layer graphene and/or single-layer graphene, the shear strain rate generated in the polymer during processing must cause a shear stress in the graphite particles greater than the critical stress required to separate two layers of graphite, or the interlayer shear strength (ISS). The shear strain rate within the polymer is controlled by the type of polymer and the processing parameters, including the geometry of the mixer, processing temperature, and speed in revolutions per minute (RPM).

The required processing temperature and speed (RPM) for a particular polymer is determinable from polymer rheology data given that, at a constant temperature, the shear strain rate ($\dot{\gamma}$) is linearly dependent upon RPM, as shown by Equation 1. The geometry of the mixer appears as the rotor radius, r, and the space between the rotor and the barrel, $\Delta r$.

$$\dot{\gamma} = \left(\frac{2\pi r}{\Delta r}\right)\left(\frac{RPM}{60}\right) \qquad \text{Equation 1}$$

Polymer rheology data collected for a particular polymer at three different temperatures provides a log shear stress versus log shear strain rate graph. The ISS of graphite ranges between 0.2 MPa and 7 GPa, but a new method has quantified the ISS at 0.14 GPa. Thus, to mechanically exfoliate graphite in a polymer matrix during processing, the required processing temperature, shear strain rate, and RPM is determinable for a particular polymer from a graph of the log shear stress versus the log shear strain rate, collected for a polymer at a constant temperature, so that the shear stress within the polymer is equal to or greater than the ISS of graphite. Under typical processing conditions, polymers have sufficient surface energy to behave like the sticky side of adhesive tape, and thus are able to share the shear stress between the polymer melt and the graphite particles.

In one embodiment, a method for forming a G-PMC includes distributing graphite microparticles into a molten thermoplastic polymer phase. A succession of shear strain events are then applied to the molten polymer phase so that the molten polymer phase exfoliates the graphite successively with each event until at least 50% of the graphite is exfoliated to form a distribution in the molten polymer phase of single- and multi-layer graphene nanoparticles less than 50 nanometers thick along a c-axis direction.

In another embodiment, a method for forming a cross-linked G-PMC includes distributing graphite microparticles into a molten thermoplastic polymer phase comprising one or more molten thermoplastic polymers. A succession of shear strain events, as illustrated in the examples, are then applied to the molten polymer phase so that the molten polymer phase exfoliates the graphene successively with each event until a lower level of graphene layer thickness is achieved, after which point ripping and tearing of exfoliated multilayer graphene sheets occurs and produces reactive edges on the multilayer sheets that react with and cross-link the thermoplastic polymer.

In another embodiment, the cross-linked G-PMC can be ground into particles and blended with non-cross-linked host polymers to serve as toughening agents for the host polymer. The non-cross-linked polymer acquires the properties of the cross-linked polymer because of chain entanglement between the two polymer species. The present invention therefore also includes cross-linked polymers of the present invention in particulate form that can be blended with other polymers to form a high strength composite. In one embodiment cross-linked polystyrene and polymethyl methacrylate (PMMA) particles of the present invention can be used as toughening agents for host polymers. Compositions according to the present invention include host thermoplastic polymers toughened with between about 1 and about 75% by weight of the cross-linked polymer particles of the present invention. In one embodiment, the host polymers are toughened with between about 10 and about 50% by weight of the cross-linked polymer particles.

In certain embodiments, the thermoplastic polymer is an aromatic polymer. As defined herein the term "aromatic polymer" refers to a polymer comprising aromatic moieties, either as part of the polymer backbone or as substituents attached to the polymer backbone, optionally via a linker. Linkers include linear or branched alkylene groups, such as methylene, ethylene, and propylene, linear or branched heteroalkylene groups, such as —OCH$_2$—, —CH$_2$O—, —OCH$_2$CH$_2$—, —CH$_2$CH$_2$O—, —OCH$_2$CH$_2$CH$_2$—, —CH$_2$OCH$_2$—, —OCH(CH$_3$)—, —SCH$_2$—, —CH$_2$S—, —NRCH$_2$—, —CH$_2$NR—, and the like, where the heteroatom is selected from the groups consisting of oxygen, nitrogen and sulfur, and R is selected from hydrogen and lower alkyl. Linkers can also be heteroatomic, such as —O—, —NR— and —S—. When the linkers contain sulfur, the sulfur atom is optionally oxidized. The aromatic moieties are selected from monocyclic, e.g. phenyl, and polycyclic moieties, e.g. naphthyl, indole, anthracene, etc., and are optionally substituted with amino, NHR, NR$_2$, halogen, nitro, cyano, alkylthio, alkoxy, alkyl, haloalkyl, CO$_2$R where R is defined as above, and combinations of two or more thereof. The aromatic moieties can also be heteroaryl, comprising one to three heteroatoms selected from the group consisting of oxygen, nitrogen and sulfur, and optionally substituted as described above. The aromatic polymer preferably comprises phenyl groups, optionally substituted as disclosed above, either as part of the polymer backbone or as substituents on the backbone, the latter optionally through a linker, as disclosed above. In certain embodiments the optionally substituted phenyl groups are contained within the polymer backbone as optionally substituted phenylene groups. In certain other embodiments the optionally substituted phenyl groups are substituents on the polymer backbone, optionally connected through a linker, as described above.

Examples of thermoplastic host polymers include, but are not limited to, polyetherether-ketone (PEEK), polyetherketone (PEK), polyphenylene sulfide (PPS), polyethylene sulfide (PES), polyetherimide (PEI), polyvinylidene fluoride (PVDF), polysulfone (PSU), polycarbonate (PC), polyphenylene ether, aromatic thermoplastic polyesters, aromatic polysulfones, thermo-plastic polyimides, liquid crystal polymers, thermoplastic elastomers, polyethylene, poly-propylene, polystyrene (PS), acrylics such as polymethylmethacrylate (PMMA), polyacrylo-nitrile (PAN), acrylonitrile butadiene styrene (ABS), and the like, ultra-high-molecular-weight polyethylene (UHMWPE), polytetrafluoroethylene (PTFE/Teflon®), polyamides (PA) such as nylons, polyphenylene oxide (PPO), polyoxymethylene plastic (POM/Acetal), polyimides, polyaryletherketones, polyvinylchloride (PVC), acrylics, mixtures thereof, and the like. When the thermoplastic host polymer and the cross-linked polymer are the same polymer species, the cross-linked polymer particles are essentially a concentrated masterbatch of the degree of cross-linked species desired to be introduced to the polymer formulation.

Therefore, another aspect of the present invention provides a method for forming a high strength graphene-reinforced polymer matrix composite by distributing graphite micro-particles into a molten thermoplastic polymer phase comprising one or more molten thermoplastic polymers. A succession of shear strain events, as illustrated in the examples, are then applied to the molten polymer phase so that the molten polymer phase exfoliates the graphene successively with each event until tearing of exfoliated multilayer graphene sheets occurs and produces reactive edges on said multilayer sheets that react with and cross-link the thermoplastic polymer. The cross-linked graphene and thermoplastic polymer is then ground into particles that are distributed into another non-cross-linked polymer.

Thus, activated graphene is formed as the graphene fractures across basal plane and offers potential sites for cross-linking to the matrix or attaching other chemically unstable groups for functionalization. Therefore, the cross-linking is performed under exclusion of oxygen, preferably under an inert atmosphere or a vacuum, so that the reactive edges do not oxidize or otherwise become unreactive. Forming covalent bonds between graphene and the matrix significantly increases the composite strength. Polymers that cross-link when subjected to the method of the present invention include polymers subject to degradation by ultraviolet (UV) light. This includes polymers containing aromatic, e.g., benzene rings, such as polystyrene, polymers containing tertiary carbons, such as polypropylene and the like, polymers containing backbone oxygens, such as poly(alkylene oxides), and the like.

In certain embodiments, the graphite particles may be prepared by crushing and grinding a graphite-containing mineral to millimeter-sized dimensions. The millimeter-sized particles may be reduced to micron-sized dimensions using ball milling and attritor milling.

In certain embodiments, the graphite particles may be extracted from the micron-sized particle mixture, preferably by a flotation method. The extracted graphite particles may be incorporated in a polymer matrix using a single screw extruder with axial fluted extensional mixing elements or spiral fluted extensional mixing elements. The graphite-containing polymer matrix is subjected to repeated extrusion as described herein to induce exfoliation of the graphitic material, thus forming a uniform dispersion of graphene nanoparticles in the polymer matrix.

In other embodiments, the succession of shear strain events may be applied until at least 50% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 90% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 80% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 75% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 70% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 60% of the graphite is exfoliated to form a distribution in the molten polymer phase of single- and multi-layer graphene nanoparticles less than 10 nanometers thick along the c-axis direction.

In other embodiments, the graphite may be doped with other elements to modify the surface chemistry of the exfoliated graphene nanoparticles. The graphite is expanded graphite.

In other embodiments, the surface chemistry or nanostructure of the dispersed graphite may be modified to enhance bond strength with the polymer matrix to increase strength and stiffness of the graphene composite.

In other embodiments, directional alignment of the graphene nanoparticles is used to obtain one-, two- or three-dimensional reinforcement of the polymer matrix phase.

In another embodiment, a graphene-reinforced polymer matrix composite is formed according to the methods described herein. Thermoplastic polymer composites are provided in which polymer chains are inter-molecularly cross-linked by torn single- and multi-layer graphene sheets by means of covalent bonding sites exposed on the torn graphene sheet edges.

In certain embodiments, the thermoplastic polymer of the graphene-reinforced polymer matrix composite is an aromatic polymer, as defined above.

In other embodiments, the graphene-reinforced polymer matrix composite consists of graphite cross-linked with polymers selected from the group consisting of polyetheretherketone (PEEK), polyetherketone (PEK), polyphenylene sulfide (PPS), polyethylene sulfide (PES), polyetherimide (PEI), polyvinylidene fluoride (PVDF), polycarbonate (PC), polyphenylene ether, aromatic thermoplastic polyesters, thermoplastic polyimides, liquid crystal polymers, thermoplastic elastomers, polyethylene, polypropylene, polystyrene (PS), acrylics, such as polymethylmethacrylate (PMMA), polyacrylonitrile (PAN), acrylonitrile butadiene styrene (ABS), and the like, ultra-high-molecular-weight polyethylene (UHMWPE), polytetrafluoroethylene (PTFE/Teflon®), polyamides (PA), such as nylons, polyphenylene oxide (PPO), polyoxymethylene plastic (POM/Acetal), polyaryletherketones, polyvinylchloride (PVC), mixtures thereof, and the like.

In other embodiments, the graphene-reinforced polymer matrix composite consists of graphite cross-linked with polyetheretherketone (PEEK). Sulfonated PEEK can also be cross-linked. PEEK that is cross-linked in this manner will have very high specific properties and is suitable for automotive, aviation and aerospace uses. The present invention therefore also includes automotive, aircraft and aerospace parts formed from the cross-linked PEEK of the present invention, which can replace heavier metal parts without a loss of mechanical or high temperature properties. For example, cross-linked PEEK can be used in engine components such as pistons, valves, cam shafts, turbochargers and the like because of its high melting point and creep resistance. Forming the rotating portions of the turbine and compressor parts of a turbocharger from the cross-linked PEEK of the present invention will reduce turbocharger lag because of the resulting weight reduction. Other advantages are obtained by forming the rotating portions of the turbine and compressor of jet engines from the cross-linked PEEK of the present invention.

EXAMPLES

The present invention is further illustrated by the following examples, which should not be construed as limiting in any way. While some embodiments have been illustrated and described, it should be understood that changes and modifications can be made therein in accordance with ordinary skill in the art without departing from the invention in its broader aspects as defined in the following claims.

In one embodiment, a small scale extension mixer with a 10-gram capacity was used to compound 2% of SMG with Udel P-1700 Polysulfone (PSU) at 332° C. (630° F.) and under vacuum for 3, 30, and 90 minutes. The method is described below. Samples collected for characterization after each length of time are referred to as 3G-PMC, 30G-PMC, 90G-PMC.

1. 9.8 grams of PSU were added to the mixer and allowed to become molten.
2. 0.2 grams of SMG were added to the molten PSU and mixed.
3. After 3 minutes of mixing time, 3 grams of the G-PMC were extruded out of the mixer and collected for characterization.
4. 3 grams of 2% SMG in PSU was added to the mixer and mixed.
5. After 30 minutes of mixing time, 3 grams of the G-PMC were extruded out of the mixer and collected for characterization.
6. 3 grams of 2% SMG in PSU was added to the mixer and mixed.
7. After 90 minutes of mixing time, 3 grams of the G-PMC were extruded out of the mixer and collected for characterization.

Morphology Analysis

A Zeiss Sigma Field Emission Scanning Electron Microscope (FESEM) with Oxford EDS was used to determine the degree of mechanical exfoliation of graphite into multi-layer graphene or graphene nanoparticles and the thickness of these particles. An accelerating voltage of 3 kV and working distance of approximately 8.5 mm was used during viewing. Prior to viewing, specimens from each sample of 3G-PMC, 30G-PMC, and 90G-PMC were notched, cryogenically fractured to produce a flat fracture surface, placed under vacuum for at least 24 hours, gold coated, and stored under vacuum.

X-Ray Diffraction Analysis (XRD)

XRD analysis on each sample of 3G-PMC, 30G-PMC, and 90G-PMC includes four steps: (1) sample preparation, (2) diffraction pattern acquisition, (3) profile fitting, and (4) out-of-plane (D) crystallite sizes calculation according to the Debye-Scherrer equation.

1. The samples for XRD analysis were prepared by pressing thin films of each sample 3G-PMC, 30G-PMC, and 90G-PMC at 230° C. and 5,500 psi over a 2 minute time period. Each sample was positioned between aluminum sheets prior to pressing using a Carver Uniaxial Press with heated platens.
2. Diffraction patterns of the pressed films were acquired using a Philips XPert powder Diffractometer with sample changer (Xpert) at 40 kV and 45 mA with an incident slit thickness of 0.3 mm from 4°-70° 2θ and a step size of 0.02° 2θ.
3. Diffraction patterns were uploaded into WinPLOTR Powder diffraction graphics tool, without background editing or profile adjustments prior to peak fitting. Single peak fitting was applied at a 2θ range of 26°-27.5°, using a pseudo-Voigt function and taking into account a global FWHM, global eta (proportion of Lorentz), and linear background. Single peak fitting of the profile provides the full width at half maximum (FWHM) of the relevant peak.

The average out-of-plane crystallite size (D) (sometimes referred to as along the c-axis, and proportional to the number of graphene layers which are stacked) is calculated using the Debye-Scherrer Equation and the (002) FWHM values, for which λ is the X-ray wavelength, coefficient K=0.89, β is the FWHM in radians, and θ is the diffraction angle. The d-spacing is also calculated.

$$D = \frac{K\lambda}{\beta \cos\theta} \qquad \text{Equation 2}$$

Morphology Results

The morphology of each sample, 3G-PMC, 30G-PMC, and 90G-PMC, at three different scales (magnification) is shown in FIG. 1. In (a-c), a 20 μm scale and 1,000× magnification shows good distribution of multi-layer graphene or graphene within the PSU matrix at each mixing time. In (d-f), a 1 μm scale and 10,000× magnification and (g-i), a 1 μm scale and 50,000× magnification shows mechanically exfoliated graphite within the PSU matrix. In (d-i), micro-folding of the multi-layer graphene or graphene is evident, as well as good bonding between the graphene nanoparticles and the polymer matrix.

Figures 2A, 2B, 2C:
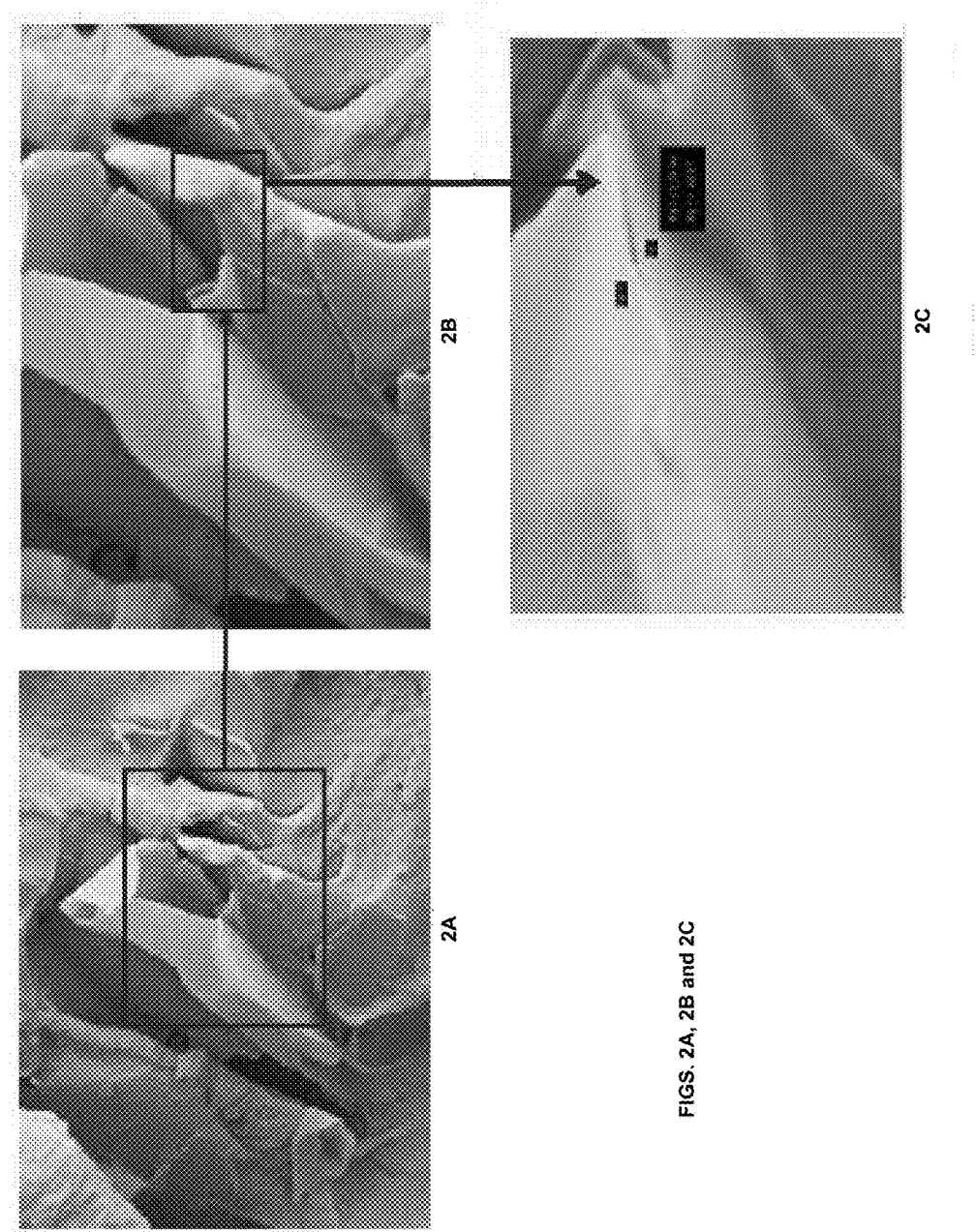
FIGS. 2A, 2B and 2C illustrate micrographs of 90G-PMC at various scales and magnification levels according to an in situ exfoliation method of the present disclosure.
Figure 3A:
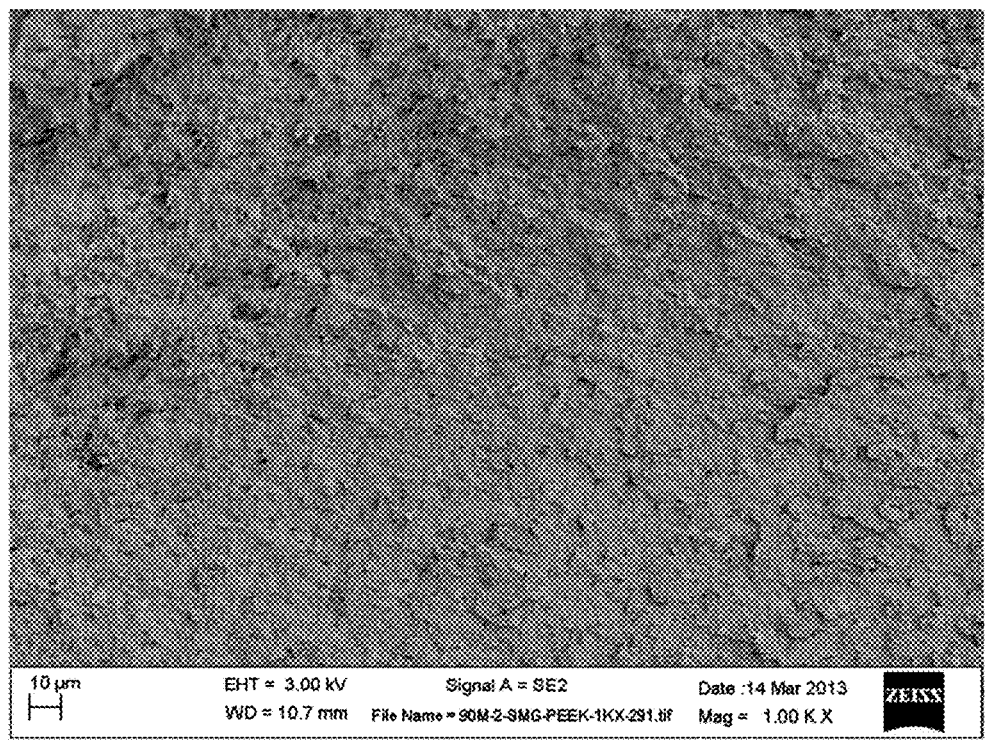
FIGS. 3A, 3B, 3C and 3D illustrate the morphology of SMG-PEEK_90 at (a) 10 μm scale and 1,000×, (b) 10 μm scale and 5,000×, (c) 1 μm scale and 10,000×, and (d) 1 μm scale and 50,000×.
Figure 3B:
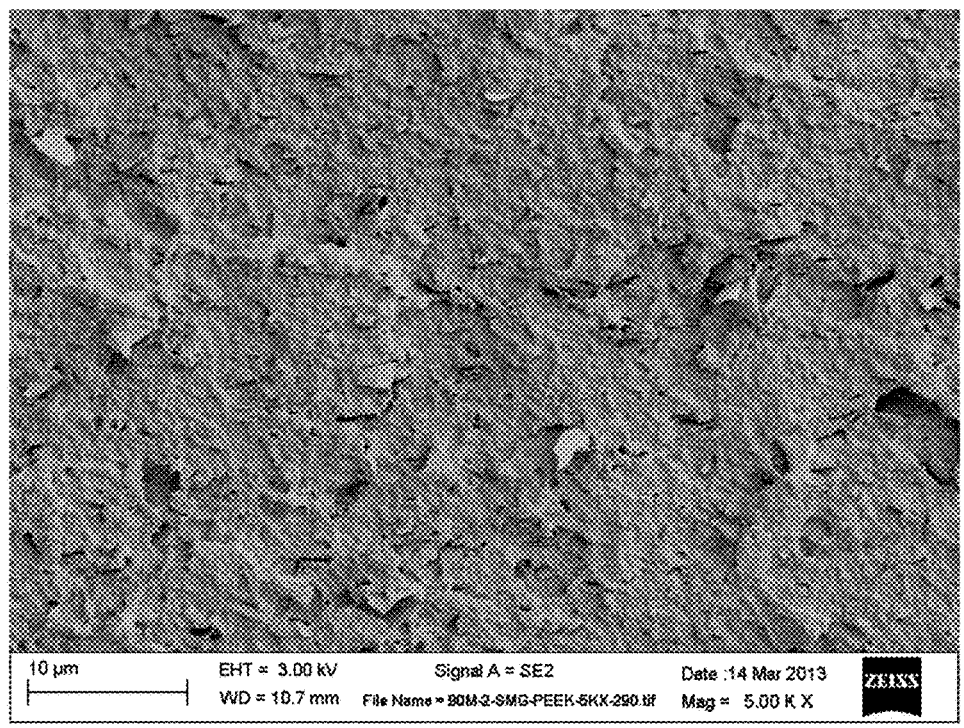
Figure 3C:
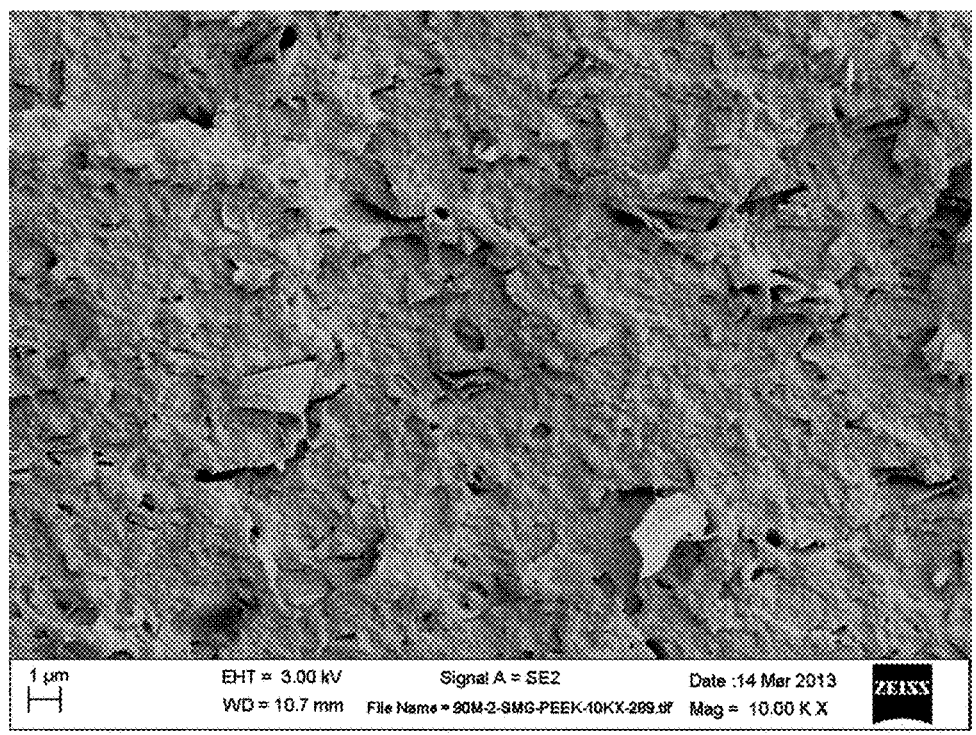
Figure 3D:
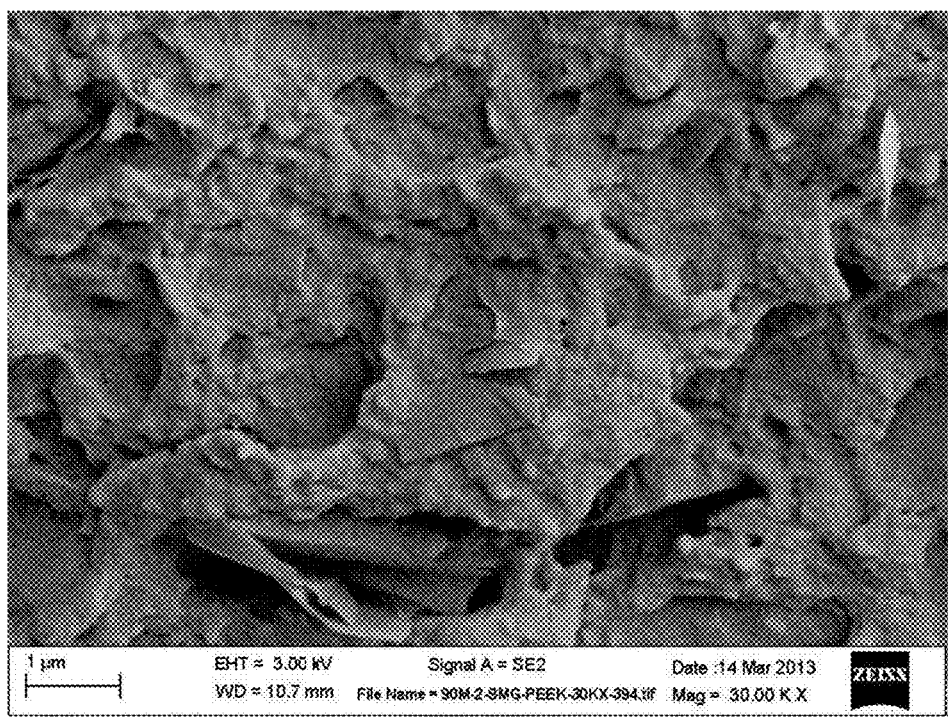

The 90G-PMC sample, the sample mixed for the longest time and exposed to the most repetitive shearing, exhibits superior mechanical exfoliation and the smallest crystal size. As shown in FIG. 2, mechanical exfoliation has reduced the graphene nanoparticle thickness in the 90G-PMC sample to 8.29 nm.

X-Ray Diffraction Results

The Debye-Scherrer equation was applied to the FWHM and d-spacing results obtained from the X-ray diffraction patterns for 3G-PMC, 30G-PMC, and 90G-PMC to provide the crystal thickness (D) of the multi-layer graphene or graphene nanoparticles. The XRD results and crystal thickness appear in Table 1. For the 3G-PMC, 30G-PMC, and 90G-PMC samples, the crystal thickness is 40 nm, 31 nm, and 23 nm; the FWHM is 0.202°, 0.257°, and 0.353°; and the d-spacing is 3.361 nm, 3.353 nm, and 3.387 nm, respectively. The FWHM increases with mixing time, and crystal thickness decreases with mixing time, which indicates that mechanical exfoliation of the graphite to multi-layer graphene or graphene is occurring and is enhanced over longer mixing times. The decrease in crystal size is a function of FWHM.

TABLE 1

Debye-Scherrer Equation applied to the average
XRD results from each 2% Graphite Exfoliated in
PSU sample mixed for 3 min, 30 min, and 90 min

| Sample | Mixing Time (min) | (d 002) (nm) | FWHM (degrees) | Average D - Crystal Thickness (nm) Along c-Axis Direction |
|---|---|---|---|---|
| 3G-PMC | 3 | 0.3361 | 0.202 | 40 |
| 30G-PMC | 30 | 0.3353 | 0.257 | 31 |
| 90G-PMC | 90 | 0.3387 | 0.353 | 23 |

Graphene Modification

Mechanical exfoliation of the graphite into multi-layer graphene or graphene as a result of the repetitive shear strain action in the polymer processing equipment generates dangling primary and secondary bonds that provide the opportunity for various chemical reactions to occur, which can be exploited to obtain property enhancement of the G-PMC. This represents an advance over prior art conventional methods forming graphene oxides, where the dangling primary and secondary bonds covalently bond with oxygen, which typically remain in these positions even after the graphene oxide is reduced.

For example, chemical reactions that covalently attach these dangling bonds from the multi-layer graphene or graphene nanoparticles to the polymer matrix would provide superior mechanical properties of the G-PMC. Alternatively, electrical conductivity may be enhanced by chemically linking appropriate band gap materials at the graphene nano-particle edges or by coordinating with conductive metals such as gold, silver, copper, and the like. The graphene-reinforced polymer may then be added to polymers or other compositions to provide or increase electrical conductivity. The bonds may also be coordinated to metals, such as platinum and palladium, to provide a catalyst, with the graphene-reinforced polymer serving as a catalyst support. Other forms of functionalized graphene are disclosed in U.S. Pat. No. 8,096,353, the disclosure of which is incorporated herein by reference.

The method of the present invention is particularly advantageous because in situ functionalization reactions may be performed during the exfoliation process via one-pot reactive compounding.

The graphene-reinforced polymers may be used as electrodes for lightweight batteries. Other uses include composite boat hulls, aircraft, aerospace systems, transportation vehicles, lightweight armor (vehicular or personnel armor), pressure vessels, reactor chambers, spray coatings, polymer powders for 3-D printing, transparent electrodes for electronic device touch screens, and the like. Addition of 1-2 wt % graphene to a polymer matrix imparts electrical conductivity, while maintaining optical transparency, thus enabling applications in solar panels, flat-panel displays, and for static-discharge control in hospitals.

Mechanical exfoliation successfully converted 2% graphite melt-blended with PSU into a G-PMC using a repetitive shearing action in the Small Scale Extension Mixer by Randcastle Extrusion Systems, Inc. ("Randcastle"). Results may be improved by machine modification to increase shear; for example, by using a larger diameter mixing element to increase rotational speed and/or by minimizing the spacing between the mixing element and the cylinder wall.

Modified Randcastle Extrusion System's Small Scale Extension Mixer:

The design of the existing small batch mixer may be modified to provide higher shear rate, which in turn provides superior mechanical exfoliation of graphite within the polymer matrix. The shear rate, $\dot{\gamma}$, is calculated according to Equation 1, where r is the tooling radius and $\Delta r$ is the clearance for compounding. Machine modifications are listed in Table 2, along with the maximum achievable shear rate. The newly designed mixer has a maximum shear rate 22 times that of the current mixer, which will provide enhanced mechanical exfoliation of graphite within a polymer matrix at shorter lengths of time. In other words, the crystal size, D, may be reduced to smaller dimensions in a more efficient length of time.

TABLE 2

Modifications of the Randcastle Extrusion System's Small Scale
Extension Mixer to provide enhanced mechanical exfoliation

| | Current Randcastle Mixer | Improved Randcastle Mixer |
|---|---|---|
| Tooling Radius (inches) | 0.5 | 1 |
| Clearance for Compounding, $\Delta r$ (in) | 0.04 | 0.01 |
| Maximum RPM | 100 | 360 |
| Maximum Shear Strain Rate ($sec^{-1}$) | 133 | 2900 |

Modified Single Screw Extrusion:

Randcastle has made modifications to the extruder screw that will better enable mechanical exfoliation of the graphite into multi-layer graphene or graphene in a polymer matrix to fabricate a G-PMC.

Materials

Raw graphite was extracted from the ground, crushed to powder, and float separated to obtain Separated Mineral Graphite ("SMG").

PEEK has a specific gravity of 1.3, a melt flow of 3 g/10 min (400° C., 2.16 kg), a glass transition temperature at 150° C., and a melting point at 340° C. The tensile modulus and strength are 3.5 GPa and 95 MPa, respectively. Prior to the creation of the xG-PMC in this example, SMG and PEEK were dried for approximately 12 hours at 100° C. and 150° C., respectively.

In this example, SMG was blended with PEEK using a Randcastle micro-batch mixer with a 10-gram capacity at 360° C. (680° F.) and 100 RPM under a nitrogen blanket, according to the following steps:

PEEK_3—To create a control sample, 10 grams of PEEK was added to the mixer. After three minutes of mixing time, the port was opened to allow PEEK to flow out as extrudate and 2.6 grams were extruded out until no more material was able to flow.

SMG-PEEK_3—To create a weight composition ratio of 2-98% SMG-PEEK, 2.4 g of PEEK and 0.2 g of SMG were added to the mixer. After three minutes of mixing time, the port was opened to allow G-PMC to flow out as extrudate and 1.96 g were extruded out until no more material was able to flow.

SMG-PEEK_30—To maintain the 2-98 wt % composition ratio, 1.92 g of PEEK and 0.04 g of SMG were added to the mixer. After 30 minutes of mixing time, the port was opened to allow G-PMC to flow out as extrudate and 0.94 g were extruded out until no more material was able to flow.

SMG-PEEK_90—To maintain the 2-98 wt % composition ratio, 0.92 g of PEEK and 0.02 g of SMG were added to the mixer. After 90 minutes of mixing time, the port was opened to allow G-PMC to flow out as extrudate, however, no more material was able to flow.

The experiment was terminated and the mixer opened. Under visual observation, the G-PMC did not appear as a standard molten polymer, but rather was in a rubber-like, fibrous form.

In this next example, SMG and PEEK were processed in a Randcastle micro-batch mixer with a 100-gram capacity at 360° C. (680° F.) and 30 RPM under a nitrogen blanket, according to the following steps:

PEEK_90—To create a control sample, 100 g of PEEK was added to the mixer. After 90 minutes of mixing time, the port was opened to allow PEEK to flow out as extrudate and 28.5 g were extruded out until no more material was able to flow.

SMG-PEEK_25—To create a weight composition ratio of 2-98% SMG-PEEK, 98 g of PEEK and 2 g of SMG were added to the mixer. After 25 minutes, of mixing time, the port was opened to allow G-PMC to flow out as extrudate and 5.1 g were extruded out until no more material was able to flow.

Characterization

The samples used for characterization appear in Table 3, as follows:

TABLE 3

Samples Used for Characterization

| Sample | Description | Batch Mixer (Capacity) | Graph Color |
|---|---|---|---|
| PEEK_3 | Control mixed for 3 minutes | 10 g | Green |
| PEEK_90 | Control mixed for 90 minutes | 100 g | Purple |
| SMG-PEEK_3 | Components mixed for 3 minutes | 10 g | Orange |
| SMG-PEEK_30 | Components mixed for 30 minutes | 10 g | Blue |
| SMG-PEEK_90 | Components mixed for 90 minutes | 10 g | Red |

Morphology

The morphology of the xG-PMC was examined using a Zeiss Sigma Field Emission Scanning Electron Microscope ("FESEM") with Oxford EDS. An accelerating voltage of 3 kV and working distance of approximately 8.5 mm was used during viewing. Prior to viewing, specimens were notched, cryogenically fractured to produce a flat fracture surface, placed under vacuum for at least 24 hours, gold coated, and stored under vacuum. As illustrated in FIG. 3, the morphology of SMG-PEEK_90 is shown in (a) 10 μm scale and 1,000 magnification (b) 10 μm scale and 5,000 magnification, (c) 1 μm scale and 10,000 magnification, and (d) 1 μm scale and 50,000 magnification.

Thermal Analysis

The thermal properties of the samples were characterized using a TA Instruments Q1000 Differential Scanning calorimeter (DSC). Each sample was subject to a heat/cool/heat cycle from 0-400° C. at 10° C./min. The glass transition temperature (Tg) and melting temperature (Tm) for the initial heat scan are illustrated in FIG. 3. The Tg increases from 152° C. for PEEK_3 to 154 for SMG-PEEK_90, however, this increase is not significant. The Tm is consistent for samples PEEK_3, SMG-PEEK_3, and SMG-PEEK_30 at almost 338° C. but decreases significantly to 331.7° C. for SMG-PEEK_90. The delta H is similar for samples PEEK_3, SMG-PEEK_3, and SMG-PEEK_30, and varies between the initial, cool, and reheat scans, and ranges between 116-140 J/g. However, the delta H for SMG-PEEK_90 is much lower and consistent at approximately 100 J/g for the initial, cool, and reheat scans. The observable difference in the heat of fusion of PEEK for the SMG-PEEK_90 sample, as compared with the other samples, indicates a major difference in the morphology. Furthermore, the constant heat of fusion between the initial, cool, and reheat scans of the SMG-PEEK_90 sample supports the existence of cross links between the graphene and PEEK matrix.

Parallel Plate Rheology

A frequency sweep from 100-0.01 Hz at 1.0% strain and at a temperature of 360° C. was performed using a TA Instruments AR 2000 in parallel plate mode. Samples SMG-PEEK_30, SMG-PEEK_3, and PEEK_3 were tested. The G' and G" and the tan delta for samples SMG-PEEK_30, SMG-PEEK_3, and PEEK_3 were recorded. Tan delta is equal to the G"/G'. This rheology data provides information regarding the morphology of the sample, according to Table 4, as shown below. The sol/gel transition point, or "gel point", of a thermoset resin occurs when tan delta=1, or rather when G'=G". For samples SMG-PEEK_3 and PEEK_3, the G" is greater than the G', indicating liquid-like behavior. Contrastingly for sample SMG-PEEK_30, the G' is greater than G", indicating more elastic-like or solid-like behavior. Furthermore, tan delta is less than 1 and remains nearly constant across the entire frequency range for SMG-PEEK_30, indicating that SMG-PEEK_30 has undergone some degree of cross-linking

TABLE 4

Rheology data and the sol/gel transition point

| State | Morphology | Tan δ | Shear and Loss Moduli | Sample Behavior |
|---|---|---|---|---|
| Liquid state | "Sol State" | >1 | G" > G' | PEEK_3 SMG-PEEK_3 |
| Gel point | Cross linking begins | =1 | G' = G" | |
| Gel State | Solid State Sample contains cross-links | <1 | G' > G" | SMG-PEEK_30 |

Dissolution

Lightly gelled thermosetting resins when placed in solvents swell through imbibition to a degree depending on the solvent and the structure of the polymer. The original shape is preserved, and the swollen gel exhibits elastic rather than plastic properties. Cross-linking in thermoplastic polymers is commonly accomplished by 1) peroxides, 2) a grafted silane process cross-linked by water, 3) electron beam radiation, and 4) UV light.

In this example, cross-linking was induced between SMG and PEEK during a mechanical exfoliation process due to the cleavage of graphene flakes that results in dangling free radicals. To confirm the presence of cross-linking in the SMG-PEEK XG-PMC, a dissolution method was used by placing neat PEEK, PEEK_3, PEEK_90, SMG-PEEK_3, SMG-PEEK_30, and SMG-PEEK_90 samples in sulfuric acid, according to the following steps.

A 10 mg specimen from each sample was prepared;
Each specimen was placed in a test tube with 20 mL of 95-98% w/w sulfuric acid (A300S500 Fisher Scientific);
The solution was shaken for 5 minutes;
Each test tube was capped with Teflon® tape to form a seal;

Photographs of each sample were taken at times 0, 24, 48, and 72 hours.

Upon visual observation, the PEEK samples all dissolve within the sulfuric acid before 24 hours, and the SMG-PEEK_90 sample is the only one that remains in the sulfuric acid after 72 hours. The SMG-PEEK_90 sample was cross-linked and swelled when placed in the solvent similar to a thermoset resin. The SMG-PEEK_30 sample remained in the sulfuric acid after 24 hours but dissolved before 48 hours. SMG-PEEK_30 required further testing to determine if cross-linking was induced, since the other data suggests that SMG-PEEK_30 was cross-linked.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A method for forming a graphene-reinforced polymer matrix composite, comprising:
   (a) distributing graphite microparticles into a molten thermoplastic polymer phase comprising one or more molten thermoplastic polymers to form a graphite-molten thermoplastic polymer phase, wherein at least 50% of the graphite in the graphite microparticles consists of multilayer graphite crystals between 1.0 and 1000 microns thick along a c-axis direction; and
   (b) applying a succession of shear strain events to the graphite-molten thermoplastic polymer phase so that shear stress within said molten polymer phase exceeds the Interlayer Shear Strength (ISS) of said graphite micro articles and said molten polymer phase exfoliates the graphite microparticles successively with each event until said graphite microparticles are at least partially exfoliated to form a distribution in the molten polymer phase of single- or multilayer graphene nanoparticles, or both, less than 10 nm thick in a c-axis direction, and further continuing the shear strain events until graphene fractures of said exfoliated single- or multilayer graphene sheets are formed across the basal plane defined by a-axis and b-axis, wherein the edges of the graphene fractures further comprise reactive free radical graphenic carbon bonding sites directly covalently bonded to and inter-molecularly cross-linking thermoplastic polymer chains.

2. The method of claim 1, wherein at least one of said one or more thermoplastic polymers is an aromatic polymer.

3. The method of claim 2, wherein said aromatic polymer comprises phenyl groups, optionally substituted, in either the backbone or as substituents.

4. The method of claim 3, wherein the optionally substituted phenyl groups are contained within the polymer backbone as optionally substituted phenylene groups.

5. The method of claim 3, wherein the optionally substituted phenyl groups are substituents on the polymer.

6. The method of claim 1, wherein said one or more thermoplastic polymers are selected from the group consisting of polyetheretherketone (PEEK), polyetherketone (PEK), polyphenylene sulfide (PPS), polyethylene sulfide (PES), polyetherimide (PEI), polyvinylidene fluoride (PVDF), polycarbonate (PC), polyphenylene ether, aromatic thermoplastic polyesters, thermoplastic polyimides, liquid crystal polymers, thermoplastic elastomers, polyethylene, polypropylene, polystyrene (PS), polymethylmethacrylate (PMMA), polyacrylonitrile (PAN), ultra-high-molecular-weight polyethylene (UHMWPE), polytetrafluoroethylene (PTFE), acrylonitrile butadiene styrene (ABS), polyamides (PA), polyphenylene oxide (PPO), polyoxy-methylene plastic (POM/Acetal), polyimides, polyaryletherketones, polyvinylchloride (PVC), acrylics, and mixtures thereof.

7. The method of claim 6, wherein said polymer is polyetheretherketone (PEEK).

8. The method of claim 1, wherein said molten thermoplastic polymer phase comprises two or more molten thermoplastic polymers.

9. The method of claim 1, wherein the graphite particles are prepared by crushing and grinding a graphite-containing mineral to millimeter-sized dimensions, followed by milling to a micron-sized particle mixture.

10. The method of claim 9, wherein the graphite particles are extracted from the micron-sized particle mixture by a flotation method.

11. The method of claim 1, wherein the graphite is expanded graphite.

* * * * *